(12) United States Patent
Emberty et al.

(10) Patent No.: US 7,080,203 B2
(45) Date of Patent: Jul. 18, 2006

(54) SERIAL EEPROM FOR VOLUME IDENTIFICATION AND DRIVE SPECIFIC INFORMATION STORAGE IN A HARD DISK DRIVE LIBRARY

(75) Inventors: Robert George Emberty, Tucson, AZ (US); James Mitchell Karp, Tucson, AZ (US); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 10/348,259

(22) Filed: Jan. 21, 2003

(65) Prior Publication Data

US 2004/0143703 A1    Jul. 22, 2004

(51) Int. Cl.
*G06F 13/00* (2006.01)
(52) U.S. Cl. .......................... 711/115; 711/4; 711/103; 711/111; 711/112
(58) Field of Classification Search ........ 711/103–105, 711/111–112, 114, 115; 360/69
See application file for complete search history.

(56) References Cited

U.S. PATENT DOCUMENTS

| 5,289,372 | A |   | 2/1994  | Guthrie et al. |
|---|---|---|---|---|
| 5,590,376 | A |   | 12/1996 | Kou |
| 5,613,097 | A |   | 3/1997  | Bates et al. |
| 5,721,952 | A |   | 2/1998  | Lin et al. |
| 5,786,955 | A |   | 7/1998  | Kori et al. |
| 5,794,032 | A |   | 8/1998  | Leyda |
| 5,809,511 | A | * | 9/1998  | Peake .......................... 707/204 |
| 5,956,301 | A | * | 9/1999  | Dimitri et al. ........... 369/30.31 |
| 6,031,798 | A | * | 2/2000  | James et al. ............. 369/30.28 |
| 6,075,669 | A |   | 6/2000  | Takayama |
| 6,138,222 | A |   | 10/2000 | Wyde et al. |
| 6,154,790 | A |   | 11/2000 | Pruett et al. |
| 6,172,833 | B1 |  | 1/2001  | Fry et al. |
| 6,286,079 | B1 | * | 9/2001 | Basham et al. ............. 711/112 |
| 6,438,459 | B1 | * | 8/2002 | Dimitri et al. .............. 700/255 |
| 6,557,089 | B1 | * | 4/2003 | Reed et al. .................. 711/162 |
| 2002/0159183 | A1 | * | 10/2002 | Albrecht et al. ............. 360/69 |
| 2002/0162034 | A1 | * | 10/2002 | Dimitri et al. .............. 713/300 |
| 2003/0009700 | A1 | * | 1/2003  | Emberty et al. ............ 713/300 |

\* cited by examiner

*Primary Examiner*—Mano Padmanabhan
*Assistant Examiner*—Jasmine Song
(74) *Attorney, Agent, or Firm*—Quarles & Brady Streich Lang LLP (57) ABSTRACT

A method and apparatus for providing, in an automated data storage system having a plurality of removable data storage devices, independent memory devices associated with and physically attached to respective removable data storage devices for storing volume identification, RAID bundle information where applicable, and other drive specific information about their respective removable data storage devices. The removable data storage devices are typically hard disk drives, and the independent memory devices are preferably serial electrically-erasable programmable read-only memory ("EEPROM") solid state memory devices. The EEPROM operates independently of the operation of its respective removable hard disk drive, does not require that the hard disk drive be powered up, and continues to operate in the presence of a catastrophic failure of the hard disk drive.

21 Claims, 4 Drawing Sheets

SERIAL EEPROM FOR VOLUME IDENTIFICATION AND DRIVE SPECIFIC INFORMATION STORAGE IN A HARD DISK DRIVE LIBRARY

BACKGROUND OF THE INVENTION

1. Field of the Invention

This invention is related in general to the field of automated data storage systems for storing and retrieving data storage devices, particularly methods for reading volume identification and identifying contents of removable hard disk drives or other removable drives of a library without powering up each removable hard disk drive or other removable drive.

2. Discussion of the Background

Data storage libraries are available for data processing systems wherein a plurality of tape cartridges are stored in respective cells so that they are accessible by a robot, or "picker", which accepts a cartridge from an input-output port and inserts it into a cell or tape drive, transfers tape cartridges between cells and a tape drive, or places a cartridge into the input-output port for retrieval. However, tape cartridges are subject to wear and access speed limitations.

Another medium that might be used in a data storage library instead of a tape cartridge is a removable hard disk drive. However, such disc drives are subject to catastrophic failure such as: (1) inability to power up the device; (2) loss or corruption of partition information; (3) loss or corruption of directory structure; or (4) loss or corruption of data.

If a hard drive can no longer be powered up then access to data on the hard drive requires an inconvenient and time consuming process of physically repairing the device during which time additional corruption may occur to the partition table, directory structure, or data. If the partition table is corrupted, then the partition information can only be reconstructed using heroic efforts, if at all. If the directory structure or data is lost or corrupted, they may be recovered, but only if imaging information about the drive can be obtained. In most applications, imaging information is collected by software programs and stored on the hard drive itself. If the hard drive has suffered a catastrophic failure that prevents it from being powered up or has resulted in a loss of the partition table, then the image information can not be obtained and the directory structure or data cannot be recovered.

One method of recovering data after a catastrophic hard disk drive failure is to use a redundant array of independent disks ("RAID"). RAID is a way of storing a set of data and parity information on multiple hard disk drives, which increases fault tolerance. Using a RAID 3,4, or 5 system with parity or a RAID 1 system with simple mirroring allows for reconstruction of lost data due to a catastrophic hard disk drive failure.

Therefore, in order to create and maintain removable hard disk drive inventory tables without introducing additional wear and increasing the likelihood of failure to the drive, it would be desirable to obtain VOLID, partition information, directory structure or other information from a removable hard disk drive without powering it up.

It would also be desirable to have access to VOLID, partition information, directory structure or other information about a removable hard disk drive that is available even if the drive has suffered a catastrophic failure, so that a recovery and rebuild activity can occur.

It would further be desirable to store VOLID, partition information, directory structure information or other information about a removable hard disk drive on a memory device which cannot be separated from its respective removable hard disk drive during normal use.

Fry, et al. U.S. Pat. No. 6,172,833 describes a data storage system for use with a tape cartridge having a tape media for storing data in a serpentine pattern, the tape cartridge having a memory device for storing a device block map for said tape media. Fry discloses the use of a memory device to store a device block map of a tape cartridge that provides information that allows for optimal retrieval of serpentine pattern data from the tape media. The device block map for the tape cartridge is analogous to the directory structure of a hard disk drive. However, Fry describes accessing the memory device to obtain the block map in conjunction with reading data from or writing data to the tape cartridge. The memory device is not used for VOLID purposes, nor is the block map stored in the memory device used to recover or rebuild a corrupted tape cartridge.

Wyde, et al. U.S. Pat. No. 6,138,222 describes a computer system specifically comprising a non-removable disk drive that has a storage capacity that may exceed 7.875 Gigabytes of information and further comprising a non-volatile memory device that includes firmware that is executed during system initialization. The firmware in the memory device is only active when the hard disk drive is powered up and acts as an interpreter, converting cylinder and head information reported by the hard drive into hard drive capacity information that is then reported to the operating system of the computer.

Lin, et al. U.S. Pat. No. 5,721,952 describes a technique for a computer system to automatically detect the type of hard disk drive installed in the system. This method includes retrieving data from a partition table and calculating the necessary parameters from the values in the partition table, specifically, calculating a HEAD parameter and a SECTORS/TRACK parameter from certain addresses stored in the partition table. The partition table indicated is an integral component of the hard disk drive.

Leyda U.S. Pat. No. 5,794,032 describes a system for the automatic identification and configuration of a computer peripheral using an initialization program to send one or more query instructions to a peripheral device such as a CD-ROM drive. In response to the query instructions, the CD-ROM drive replies with data that can be used to identify the model number or type of CD-ROM drive. The system described by Leyda requires the drive to be powered up before it will respond to a query command.

Pruett et al, U.S. Pat. No. 6,154,790 describes a method and system for retrieving and reporting serial numbers of hard disk drives in a computer system. The invention includes copying the serial number of each of the hard disk drives to a radio frequency ("RF") enabled memory. The serial numbers can be logged utilizing a RF reader. This device provides wireless electronic tracking of computer assets such as hard disk drives, but does not teach reporting the serial numbers of disk drives, or making partition information, directory structure or other information from the hard drive available so that it may be used to recover or rebuild data stored on the hard drive.

It is known in the art that hard disk drive information such as VOLID, partition table information or directory structure may be stored on other memory devices such as a separate hard disk drive or removable storage media such as floppy disks or CD-ROMS to aid in the recovery/rebuild process. However, this information resides in a discrete volume of space that is not occupied by the removable hard disk drive with which it is associated. Without the physical attachment of the memory device to the removable hard disk drive, it cannot provide information that is unequivocally related to the hard disk drive.

Accordingly, if removable data storage devices such as hard disk drives, are to be used as storage media in a data storage library instead of tape cartridges, there is a need for an improved method and apparatus for maintaining VOLID, RAID information, partition table information, directory structure information and other information about the removable data storage devices. Further, there is a need for such a method and apparatus that does not rely on the viability of the removable drive and does not require the removable drive to be powered up. In particular, there has been a need for a memory device that is physically associated with a removable drive, occupies the same volume of space as the removable drive, and cannot be separated from the removable drive during normal use.

BRIEF SUMMARY OF THE INVENTION

The present invention meets the aforementioned needs by providing an automated data storage system for storing and retrieving information from a plurality of removable data storage devices, including independent memory devices associated with and physically attached to respective removable data storage devices for storing VOLID, RAID information, and other information about their respective removable storage devices. Preferably, the removable storage devices are hard disk drives located in a plurality of cells forming a library, and the independent memory devices are preferably serial electrically-erasable programmable read-only ("EEPROM") solid state memory devices. The information stored in the independent memory devices is used to create and maintain inventory tables and to assist in recovery or rebuild operations of corrupted removable hard disk drives. The EEPROM is attached to its respective removable hard disk drive or is disposed in a carrier used to transport and store the removable hard disk drive. The EEPROM operates independently of the operation of its removable hard disk drive, does not require that the hard disk drive be powered up, and continues to operate in the presence of a catastrophic failure of the hard disk drive.

Accordingly, it is a principal object of the present invention to provide a method and apparatus for using an independent memory device associated with a removable data storage device in an automated data storage system to store information about the removable storage device to be used for the creation and maintenance of inventory tables.

It is another object of the invention to provide a method and apparatus for using an EEPROM to store VOLID, RAID information, partition table information, directory structure information and other information about a removable hard disk drive to be used in recovering or rebuilding data from a corrupted drive.

It is a further object of the invention to provide a method and apparatus for accessing the VOLID, RAID information, partition table information, directory structure information and other information about a removable hard disk drive without powering up the removable drive.

Various other purposes and advantages of the invention will become clear from its description in the specification that follows and from the novel features particularly pointed out in the appended claims. While the preferred embodiment of this invention is directed to use of EEPROM independent memory devices with removable hard disk drives, this invention contemplates other types of independent memory devices and removable drives. Nothing in this disclosure is to be construed as limiting the scope of the invention to EEPROM independent memory devices or removable hard disk drives. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED
EMBODIMENT OF THE INVENTION

It has been proposed that a data storage library be formed by grouping numerous removable hard disk drives or other removable data storage drives or devices together and placing them in storage cells or bins ("cells"). Digital information would be stored on such removable hard disk drives. In a prospective data storage system, each removable hard disk drive would have a volume ID ("VOLID"), also known as a volume serial number ("VOLSER"), that uniquely identifies it in the library. In some applications, it is advantageous to automate access to data stored in a library by using a picker robot ("picker") to retrieve removable hard disk drives from cells and connect them to a back-plane that provides power and a communication interface. The robot would be controlled by a library manager which typically comprises a micro-processor, a memory device, an optional keyboard, and an optional video display ("monitor"). The memory would contain the library manager operating system, application software, and a database containing information tables. The tables comprising the database would maintain status information regarding the data, the drives, the pickers, and optional addressable media input/output stations ("portals"). A host computer may control the manager and receive information directly from the drives, such as VOLID, partition table information, directory structure and data. A combination of library, picker, drives, portals, and manager would comprise this prospective automated data storage system.

When information on a first removable hard disk drive which has been placed into a back-plane of this prospective system is no longer needed, or another removable hard disk drive needs to be inserted into the back-plane, the manager would instruct the picker to remove the first removable hard disk drive and return it to an appropriate cell. Often, automated data storage systems are closed systems in which access to media is restricted to picker-only access. In this instance, adding removable hard disk drives to or removing hard disk drives from a library would require management and accounting of the hard disk drive VOLIDs and data. A removable hard disk drive would be physically inserted by a human operator into a portal. The manager would instruct the picker to remove the hard disk drive from the portal and connect it to a back-plane. Information regarding the VOLID and contents of the removable hard disk drive would then be communicated to the host. The host would provide sufficient information regarding the removable hard disk drives to the manager so that information tables in the database may be updated. Optionally, VOLID, partition information, and directory structure information may be passed from the hard disk drive to the manager, eliminating the need for intervention by the host. Once the information tables have been updated, the manager would instruct the picker to remove the hard disk drive from the backplane and place it in a storage cell in the library. Conversely, removing a hard disk drive from the system would require that the manager instruct the picker to remove the hard disk drive from a cell and place it into a portal. Concurrently, the manager would remove the VOLID, partition information, and directory structure information from the tables in the database. The hard disk drive may then be removed from the portal by a human operator.

In order to create and verify inventory tables of removable hard disk drives and their contents, hard disk drives may be connected to a back-plane and powered up so that VOLID and other information may be read. This would occur even when no data is needed to be written to or read from the removable hard disk drive. However, repeatedly connecting a removable hard drive to a back-plane and powering its electrical circuits would introduce wear to the hard drive that could contribute to eventual catastrophic failure. The present invention provides an alternative which comprises using an independent memory device associated with the removable hard disk drive, or other data storage drive or device, to store information about the drive to be used for the creation and maintenance of inventory tables, thereby eliminating the need to connect the drive to the back plane and power it up.

Figure 1:
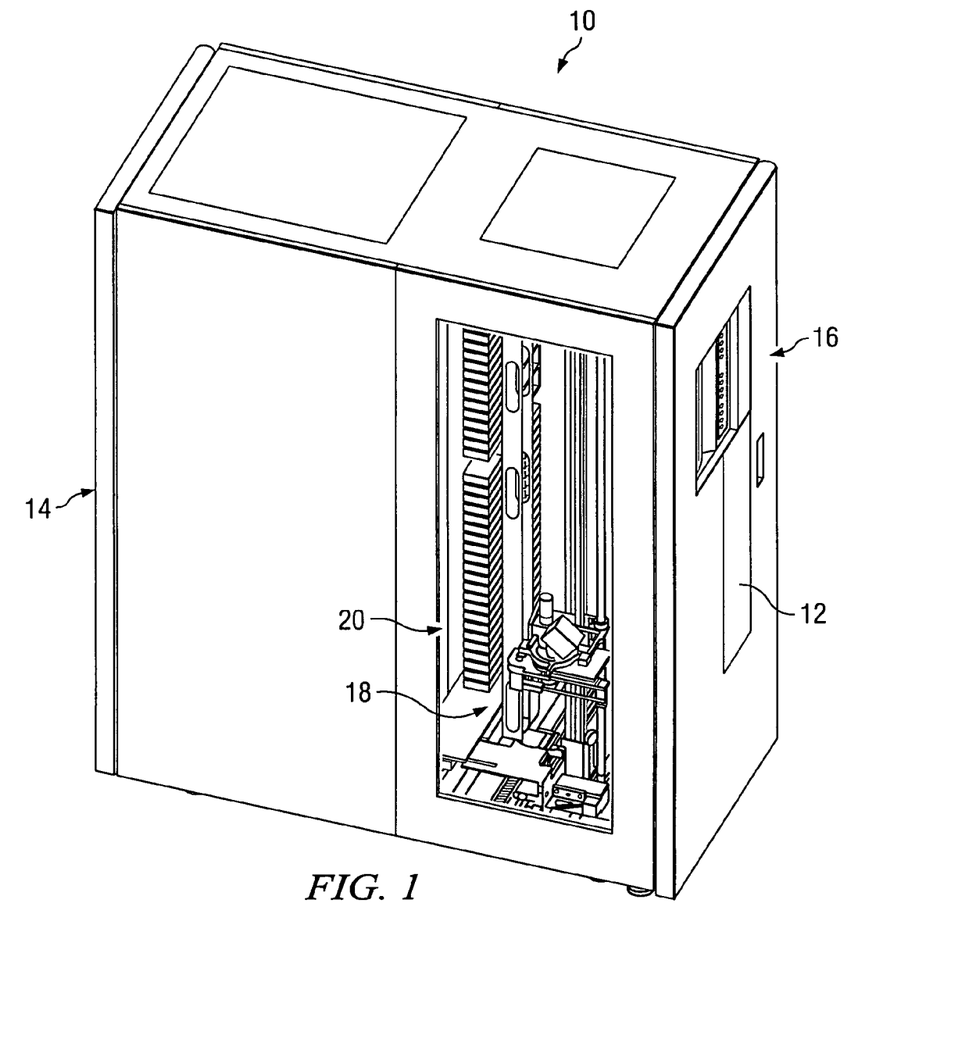
FIG. 1 is an isometric view of an exemplary automated data storage system.
Figure 2:
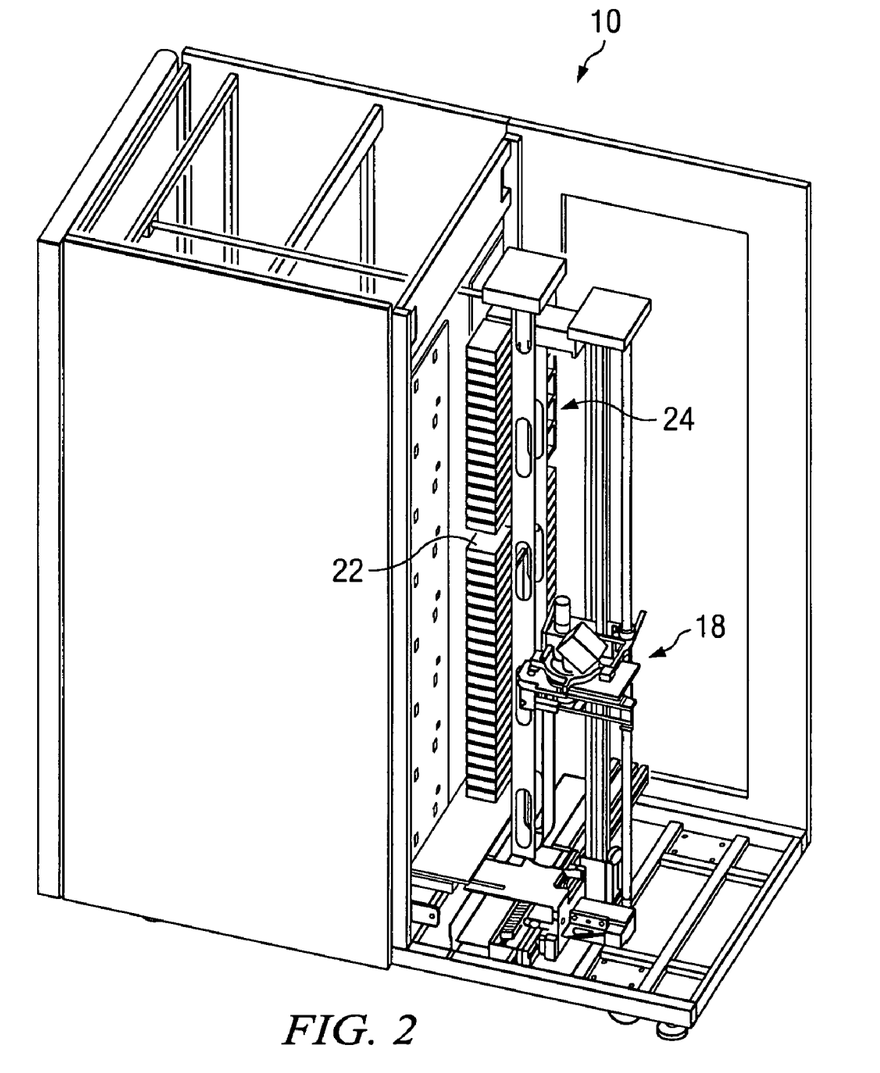
FIG. 2 is an isometric view of the automated data storage system of FIG. 1 with the top panel, front panel, and viewing window removed.

An isometric view of a typical automated data storage system 10 exemplary of the type with which the present invention is used, as shown in FIG. 1. The system 10 is an enclosed rectangular box having a front 12, a back 14, and associated top, bottom, and sides. A plurality of portals 16 are located so as to be accessible from the front 12 of the system 10. A picker robot 18 is located inside the system 10 toward the front 12 and may be seen through an optional viewing window 20. Referring to FIG. 2, the system 10 is illustrated with a front panel, a top panel, and a viewing window 20 removed. The picker 18 is used to transport carriers holding removable hard disk drives between the portals 16, library cells 22, and back-plane 24.

Figure 3:
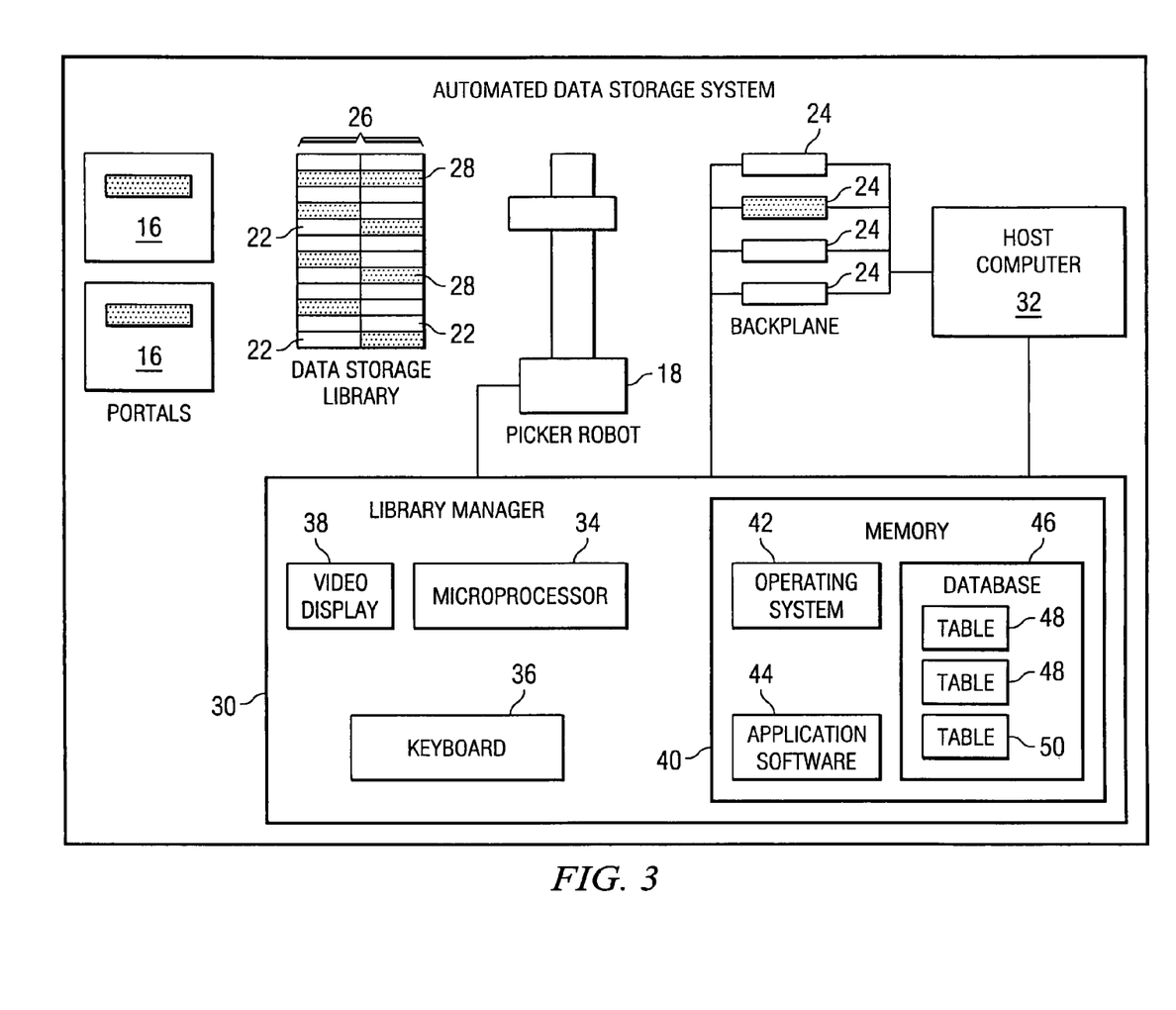
FIG. 3 is a block diagram of the automated data storage system of FIG. 1.

Turning to FIG. 3, a block diagram is used to provide a general overview of the elements comprising the system 10. A library 26 comprised of a plurality of cells 22 is used to store carriers 28 holding removable hard disk drives. The picker 18 is used to transport carriers 28 between the portals 16, the library 26, and the back-plane 24. The back-plane 24 is used to provide power and communication interface to the carriers 28 and, indirectly, to the removable hard disk drives. The picker 18 and the back-plane 24 are controlled by a library manager 30. A host 32 controls the manager 30 and sends information to and receives information from the carriers 28 containing the removable hard disk drives.

The manager 30 is comprised of a microprocessor 34, an optional keyboard 36, an optional video display monitor 38, and memory 40. The memory 40 is used to store the library manager operating system 42, application software 44, and a database 46. The drive information database 46 is comprised of tables 48, including a hard disk drive inventory table 50.

Figure 4:
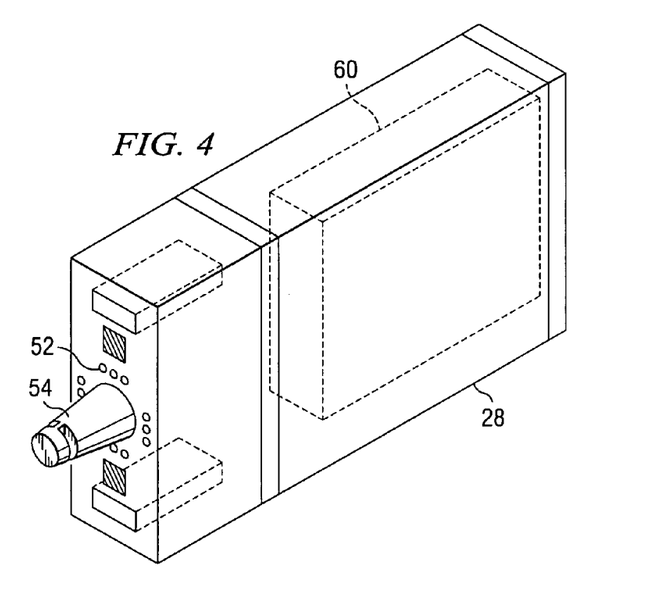
FIG. 4 is an isometric view exemplary of a carrier used to hold a removable hard disk drive during transport and storage.

An isometric view exemplary of a carrier 28 used to hold a removable hard disk drive 60 during transport and storage exemplary of the present invention is shown in FIG. 4. The carrier 28 is an enclosed rectangular box having a tapered guide pin 54 and redundant contacts 52. The guide pin 54 provides a guide to assist in aligning the contacts 52 with mating contact pins on either the picker robot 18 or the back-plane 24. Each removable hard disk drive 60 will remain with its respective carrier 28 during the period of time that the removable hard disk drive is part of the library 26 of the automated data storage system 10.

Figure 5:
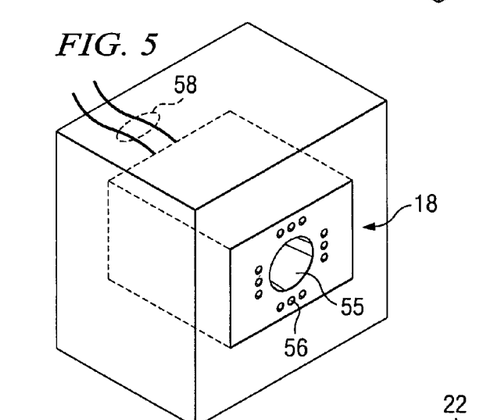
FIG. 5 is an isometric view of a picker robot used to transport removable carriers holding hard disk drives between library cell, portals and one or more back-planes.

An isometric view of a picker robot 18 used to transport carriers 28 between library cells 22, portals 16 and back-plane 24 exemplary of the present invention is shown in FIG. 5. The picker robot 18 has a mating hole 55 for accepting the tapered guide pin 54, redundant spring-loaded contact pins 56, and control and sense lines 58 used to provide power and communication interface between the picker robot 18 and the manager 30. The spring-loaded contact pins 56 provide positive contact with the redundant contacts 52. The contact pins 56 and the control and sense lines 58 form a memory interface for communicating between the host 32 and a memory device inherent to the carrier 28.

Figure 6:
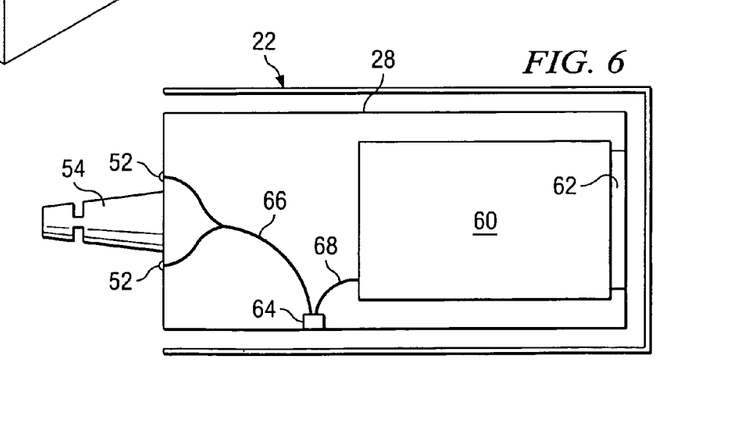
FIG. 6 is an illustration of the carrier of FIG. 4 further disclosing a serial EEPROM.

An illustration of a carrier 28 used to hold a removable hard disk drive 60 during transport and storage exemplary of the present invention is shown in FIG. 6. A back-plane connector 62 provides an interface between the removable hard disk drive 60 and the back-plane 24. A memory device 64, exemplary of the present invention is shown with electrical connection 66 to the redundant contacts 52. In the preferred embodiment of the invention, the memory device is an electrically-erasable programmable read-only memory ("EEPROM"); however, it is to be recognized that other memory devices might be used instead of an EEPROM without departing from the principles of the invention. The serial EEPROM 64 is used to store information relative to removable hard disk drive 60 or other storage device residing in the same carrier 28. This information may include a volume identification. ("VOLID"), partition table information, directory structure information, usage statistics information, error rate statistics information, model designation, hard disk drive capacity, redundant array of independent disks ("RAID") bundle information, or other information. Additionally, the concept of a RAID can be expanded to any redundant array of storage media ("RASM") and its respective bundle information can be stored in the serial EEPROM.

In particular, copying the volume identification numbers ("VOLID") of all members of the RAID directly into the EEPROM of each member of the RAID provides important redundant verification information when RAID recoveries must be performed and cartridges, e.g., hard drives, are unlabelled, in the wrong slots, damaged, or the like. Ordinarily, in a RAID-3, 4 or 5 environment, at least N−1 of the N bundled drives must be found and mounted for all data to be recovered.

In the embodiment shown, communication with the serial EEPROM can occur independent of any contact or interfacing of the removable hard disk drive 60 and back-plane connector 62 to the back-plane 24. As illustrated, the serial EEPROM can be queried when the picker robot 18 makes contact with the carrier 28. This allows the picker robot to query a serial EEPROM without removing it from its present location, either in a storage cell 22, at a portal 16, or at a back-plane 24. Additionally, the serial EEPROM can be queried while the carrier 28 is inserted into the back-plane 24, the hard disk drive 60 is powered up and communication is occurring between the removable hard disk drive 60 and the back-plane 24. Communication between the picker robot 18 and the serial EEPROM 64 occurs independently of whether the removable hard disk drive 60 is powered up, the carrier 28 is inserted into the back-plane 24 or the hard disk drive 60 is communicating with the back-plane through the back-plane connector 62.

Programming of the serial EEPROM 64, as illustrated, can occur through the picker robot 18, through the redundant contacts 52, and through the electrical connection 66. Drive information can be read from the removable hard disk drive 60 by the back-plane 24 through the back-plane connector 62, passed to the manager 30, and sent back to the picker robot 18 to be used in programming the serial EEPROM 64. Another embodiment of the invention allows the serial EEPROM 64 to be queried and programmed through the back-plane connector 62, with the electrical connection 66 connecting the serial EEPROM to the back-plane connector. In yet another embodiment of the invention, the hard disk drive 60 directly updates information in the serial EEPROM 64 via a separate interface 68, as shown in FIG. 6. This precludes the need for information to be queried by the manager 30 and sent back through the redundant contacts 52. This embodiment also reduces overhead and allows the serial EEPROM 64 to be updated more often.

Additional alternative embodiments of the invention may use non-volatile random access memory ("NVRAM"), rewritable magnetic chips, magnetic tunnel junction random access memory, or other types of electronically alterable read only memory chips rather than serial EEPROM to store information specific to the respective removable hard disk drive.

Error rate statistics and usage rate statistics may be used by the host 32 to determine when a removable hard disk drive should have its data migrated to another removable hard disk drive and the error prone or highly used hard disk drive should be removed from the automated data management system 10. Additionally, the usage statistics may be used to determine the amount of time that the removable hard disk drive 60 remains on the back-plane after its workload is completed. The host 32 can implement algorithms that will allow hard disk drives that are accessed often to remain on the back-plane for longer periods of time than hard disk drives that are accessed infrequently.

Partition table information and the directory structure information may be helpful should the hard disk drive fail or become corrupted. The greater the amount of information regarding a failed hard disk drive that is available, the better the possibility that data can be recovered from the hard disk drive. Additional information maintained by the serial EEPROM 64 might be RAID bundle information or RASM bundle information. In a RAID 3, 4, or 5 environment, at least N−1 of the N bundled drives must be found and mounted for all data to be recovered, where N is 3 or more drives. It is beneficial to maintain volume serial numbers of all members of a RAID in the serial EEPROM 64 to assist in data recovery in case of damage or incorrect labeling of removable hard disk drives 60.

One aspect of the invention is that a memory device which holds information about its respective removable hard disk drive must remain with its hard disk drive. In order to create and maintain inventory tables and provide information that may be helpful in a recovery or rebuild process, it is essential that the memory device report information that is unequivocally associated with its respective hard disk drive. In the preferred embodiment, this is accomplished by using a carrier 28 to hold both the removable hard disk drive 60 and the serial EEPROM 64.

While the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent products. The present invention is not limited by these embodiments of device status tables, device IDs, table legends, or status codes.

We claim:

1. A data storage system, comprising:
    a host computer including a picker robot
    a data storage carrier including a hard disk drive and an individual memory device in communication with the hard disk drive, wherein the individual memory device is adapted to receive device specific information from the hard disk drive; and
    means for coupling the data storage carrier to the picker robot.

2. The automated data storage system of claim 1, wherein the individual memory device is adapted to store the device specific information.

3. The data storage system of claim 1, wherein the individual memory device is adapted to maintain the device specific information when the hard disc drive is non-functional.

4. The data storage system of claim 1, wherein the individual memory device is adapted to maintain the device specific information when the hard disc drive is powered down.

5. The data storage system of claim 1, wherein the individual memory device is in communication with the host computer.

6. The data storage system of claim 5, further comprising a drive information database in communication with the host computer for maintaining the device specific information.

7. The data storage system of claim 1, further comprising a storage cell for storing the hard disc drive.

8. The data storage system of claim 1, wherein the picker robot is adapted to place the hard disc drive in communication with the host computer.

9. The data storage system of claim 8, wherein the picker robot is adapted to place the individual memory device in communication with the host computer.

10. The data storage system of claim 1, wherein the individual memory device includes an electrically-erasable programmable read-only memory ("EEPROM") device.

11. The data storage system of claim 1, wherein the device specific information includes a volume identification ("VOLID").

12. The data storage system of claim 1, wherein the hard disc drive is a member of a redundant array of independent/inexpensive disks ("RAID").

13. The automated data storage system of claim 12, wherein the device specific information includes a volume identification of all members of the RAID.

14. The data storage system of claim 1, wherein the device specific information includes a partition table of the hard disc drive.

15. The data storage system of claim 1, wherein the device specific information includes a model designation of the hard disc drive.

16. The automated data storage system of claim 1, wherein the device specific information includes error statistics of the hard disc drive.

17. The data storage system of claim 1, wherein the device specific information includes usage statistics of the hard disc drive.

18. The data storage system of claim 1, wherein the device specific information includes a hard disk drive inventory table.

19. The data storage system of claim 1, wherein the device specific information includes hard disc drive recovery information.

20. The data storage system of claim 1, wherein the individual memory device includes a non-volatile random access memory ("NVRAM").

21. The data storage system of claim 1, wherein the individual memory device includes a magnetic tunnel junction random access memory.

* * * * *

UNITED STATES PATENT AND TRADEMARK OFFICE
CERTIFICATE OF CORRECTION

| | | |
|---|---|---|
| PATENT NO. | : 7,080,203 B2 | |
| APPLICATION NO. | : 10/348259 | |
| DATED | : July 18, 2006 | |
| INVENTOR(S) | : Robert George Emberty et al. | |

It is certified that error appears in the above-identified patent and that said Letters Patent is hereby corrected as shown below:

In the claims, column 8, lines 28 and 62, and column 9, line 4, "automated" should be deleted.

Signed and Sealed this

Fifth Day of December, 2006

JON W. DUDAS
*Director of the United States Patent and Trademark Office*